(12) United States Patent
Wakatsuki et al.

(10) Patent No.: US 10,720,283 B2
(45) Date of Patent: *Jul. 21, 2020

(54) SOLID ELECTROLYTIC CAPACITOR HAVING A HIGH CAPACITANCE

(71) Applicant: AVX Corporation, Fountain Inn, SC (US)

(72) Inventors: Masayuki Wakatsuki, Shiga Pref. (JP); Yusuke Sasaki, Shiga Pref. (JP); Yunhei Moriguchi, Shiga Pref. (JP)

(73) Assignee: AVX Corporation, Fountain Inn, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/125,918

(22) Filed: Sep. 10, 2018

(65) Prior Publication Data
US 2019/0006113 A1   Jan. 3, 2019

Related U.S. Application Data

(63) Continuation of application No. 14/714,483, filed on May 18, 2015, now Pat. No. 10,074,487.

(51) Int. Cl.
*H01G 9/052* (2006.01)
*H01G 9/15* (2006.01)
*H01G 9/012* (2006.01)
*H01G 9/028* (2006.01)

(52) U.S. Cl.
CPC ........... *H01G 9/0525* (2013.01); *H01G 9/012* (2013.01); *H01G 9/052* (2013.01); *H01G 9/15* (2013.01); *H01G 9/028* (2013.01)

(58) Field of Classification Search
None
See application file for complete search history.

(56) References Cited

U.S. PATENT DOCUMENTS

| | | | |
|---|---|---|---|
| 4,141,719 | A | 2/1979 | Hakko |
| 4,945,452 | A | 7/1990 | Sturmer et al. |
| 5,111,327 | A | 5/1992 | Blohm et al. |
| 5,457,862 | A | 10/1995 | Sakata et al. |
| 5,473,503 | A | 12/1995 | Sakata et al. |
| 5,729,428 | A | 3/1998 | Sakata et al. |
| 5,812,367 | A | 9/1998 | Kudoh et al. |
| 6,635,729 | B1 | 10/2003 | Groenendaal et al. |

(Continued)

FOREIGN PATENT DOCUMENTS

| | | |
|---|---|---|
| EP | 1 736 261 A1 | 12/2006 |
| EP | 1736261 | 12/2006 |

(Continued)

OTHER PUBLICATIONS

Abstract of Japanese Patent—JPH08162372, Jun. 21, 1996, 1 page.
Abstract of Japanese Patent—JP2011113985, Jun. 9, 2011, 1 page.
Abstract of WO Patent—WO2014/199480 A1, Dec. 18, 2014, 1 page.

*Primary Examiner* — Dion Ferguson
(74) *Attorney, Agent, or Firm* — Dority & Manning, P.A.

(57) ABSTRACT

A solid electrolytic capacitor that comprises an anode that comprises a porous anode body and a dielectric layer is provided. The anode body is formed from a pressed and sintered valve metal powder having a specific charge of about 200,000 µF*V/g or more and a phosphorous content of about 150 parts per million or less. A solid electrolyte overlies the anode.

25 Claims, 1 Drawing Sheet

(56) References Cited

U.S. PATENT DOCUMENTS

| | | |
|---|---|---|
| 6,671,168 B2 | 12/2003 | Yoshida |
| 6,674,635 B1 | 1/2004 | Fife et al. |
| 6,804,109 B1 * | 10/2004 | Hahn .................. H01G 9/042 361/524 |
| 6,987,663 B2 | 1/2006 | Merker et al. |
| 7,262,511 B2 | 8/2007 | Osako et al. |
| 7,515,396 B2 | 4/2009 | Biler |
| 7,666,247 B2 | 2/2010 | He et al. |
| 7,679,885 B2 | 3/2010 | Mizusaki |
| 7,760,487 B2 * | 7/2010 | Karnik .................. C04B 35/495 361/528 |
| 8,257,463 B2 | 9/2012 | Fife et al. |
| 8,313,538 B2 | 11/2012 | Merker et al. |
| 8,747,489 B2 | 6/2014 | Pinwill |
| 8,780,529 B2 | 7/2014 | Aoyama |
| 9,105,401 B2 | 8/2015 | Dreissig |
| 9,548,163 B2 | 1/2017 | Petrzilek et al. |
| 9,824,826 B2 | 11/2017 | Petrzilek et al. |
| 10,032,564 B2 | 7/2018 | Haas |
| 10,074,487 B2 * | 9/2018 | Wakatsuki ............... H01G 9/15 |
| 2003/0133256 A1 | 7/2003 | Yoshida |
| 2003/0174459 A1 | 9/2003 | Noguchi et al. |
| 2007/0068341 A1 * | 3/2007 | Cheng .................. B22F 1/0096 75/255 |
| 2009/0067121 A1 | 3/2009 | Mizusaki et al. |
| 2009/0214378 A1 | 8/2009 | Haas |
| 2010/0085685 A1 | 4/2010 | Pinwill |
| 2013/0141841 A1 | 6/2013 | Dreissig et al. |
| 2013/0335886 A1 | 12/2013 | Pinwill |
| 2014/0022704 A1 | 1/2014 | Petrzilek et al. |

FOREIGN PATENT DOCUMENTS

| | | |
|---|---|---|
| JP | H08162372 | 6/1996 |
| JP | 2003229330 | 8/2003 |
| JP | 2011113985 | 6/2011 |
| WO | WO2007130483 | 11/2007 |
| WO | WO2014199480 | 12/2014 |

* cited by examiner

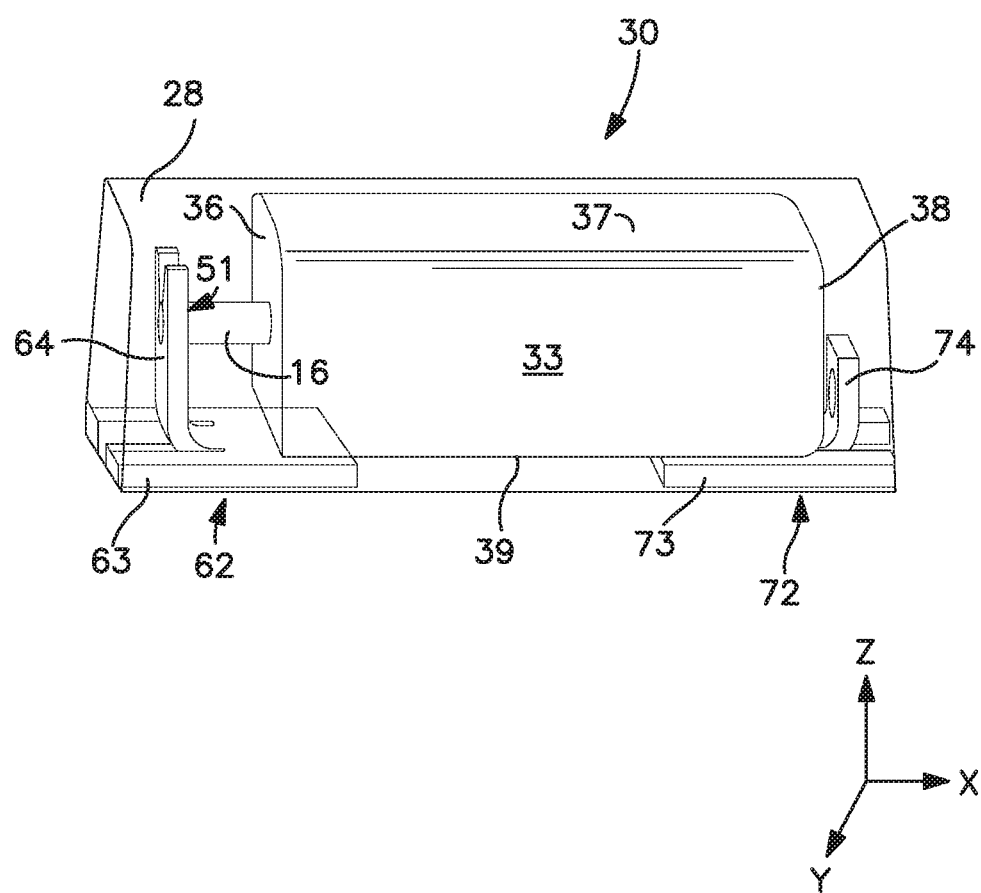

SOLID ELECTROLYTIC CAPACITOR HAVING A HIGH CAPACITANCE

CROSS REFERENCE TO RELATED APPLICATIONS

The present application is a continuation of U.S. application Ser. No. 14/714,483 filed on May 28, 2015, which is incorporated in its entirety herein by reference.

BACKGROUND OF THE INVENTION

Solid electrolytic capacitors (e.g., tantalum capacitors) have been a major contributor to the miniaturization of electronic circuits and have made possible the application of such circuits in extreme environments. Conventional solid electrolytic capacitors may be formed by pressing a metal powder (e.g., tantalum) around a metal lead wire, sintering the pressed part, anodizing the sintered anode, and thereafter applying a solid electrolyte. For many applications, it is often desirable to use metal powders having an ultrahigh specific charge—i.e., about 200,000 microFarads*Volts per gram ("µF*V/g") or more. Such ultrahigh "CV/g" powders are generally formed from particles having a nano-scale size, which results in the formation of very small pores between the particles. Unfortunately, it is often difficult to impregnate these small pores with a solid electrolyte, which has traditionally led to relatively poor electrical performance of the capacitor. As such, a need currently exists for a solid electrolytic capacitor having improved performance.

SUMMARY OF THE INVENTION

In accordance with one embodiment of the present invention, a solid electrolytic capacitor is disclosed that comprises an anode that comprises a porous anode body and a dielectric layer. The anode body is formed from a pressed and sintered valve metal powder having a specific charge of about 200,000 µF*V/g or more and a phosphorous content of about 150 parts per million or less. A solid electrolyte overlies the anode.

In accordance with another embodiment of the present invention, a method of forming a solid electrolytic capacitor is disclosed. The method comprises pressing a valve metal powder into an anode body, wherein the powder has a specific charge of about 200,000 µF*V/g or more and a phosphorous content of about 150 parts per million or less; sintering the anode body; forming a dielectric layer over the sintered anode body; and applying a solid electrolyte over the dielectric layer.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which:

FIG. 1 is a schematic illustration of one embodiment of a capacitor that may be formed in accordance with the present invention.

Repeat use of references characters in the present specification and drawing is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a solid electrolytic capacitor that contains an anode that contains a dielectric formed on a sintered porous body, and a solid electrolyte overlying the anode. The sintered porous body is formed from a valve metal powder having an ultrahigh specific charge. The specific charge of the powder may, for instance be about 200,000 microFarads*Volts per gram ("µF*V/g") or more, in some embodiments from about 250,000 to about 800,000 µF*V/g, and in some embodiments, from about 280,000 to about 600,000 µF*V/g. As is known in the art, the specific charge may be determined by multiplying capacitance by the anodizing voltage employed, and then dividing this product by the weight of the anodized electrode body. Despite being formed from a powder having an ultrahigh specific charge, the present inventors have nevertheless discovered that a capacitor having excellent electrical properties can still be formed through selective control over the anode and the manner in which it is constructed.

The capacitor can, for example, exhibit a high percentage of its wet capacitance, which enables it to have only a small capacitance loss and/or fluctuation in the presence of atmosphere humidity. This performance characteristic is quantified by the "wet-to-dry capacitance percentage", which is determined by the equation:

Wet-to-Dry Capacitance=(Dry Capacitance/Wet Capacitance)×100

The capacitor of the present invention may exhibit a wet-to-dry capacitance percentage of about 60% or more, in some embodiments about 70% or more, in some embodiments about 75% or more, and in some embodiments, from about 80% to 100%. The dry capacitance may be about 1 milliFarad per square centimeter ("m F/cm$^2$") or more, in some embodiments about 2 mF/cm$^2$ or more, in some embodiments from about 5 to about 50 mF/cm$^2$, and in some embodiments, from about 8 to about 20 mF/cm$^2$, measured at a frequency of 120 Hz. The capacitor may also exhibit a relatively low equivalence series resistance ("ESR"), such as about 3.0 ohms or less, in some embodiments from about 0.01 to about 2.5 ohms, and in some embodiments, from about 0.05 to about 2.0 ohms, measured at an operating frequency of 100 kHz. In addition, the leakage current, which generally refers to the current flowing from one conductor to an adjacent conductor through an insulator, can be maintained at relatively low levels. For example, the leakage current may be about 150 microamps ("µA") or less, in some embodiments about 100 µA or less, in some embodiments about 75 µA or less, and in some embodiments, from about 1 to about 50 µA, as determined at a voltage of 6.3 V per 60 seconds. It is also believed that the dissipation factor of the capacitor may be maintained at relatively low levels. The dissipation factor generally refers to losses that occur in the capacitor and is usually expressed as a percentage of the ideal capacitor performance. For example, the dissipation factor of the capacitor of the present invention is typically about 75% or less, in some embodiments about 65% or less, and in some embodiments, from about 1% to about 60%, as determined at a frequency of 120 Hz.

Various embodiments of the present invention will now be described in more detail.

I. Anode Body

As noted, the porous anode body is formed from a powder that contains a valve metal (i.e., metal that is capable of oxidation) or valve metal-based compound, such as tantalum, niobium, aluminum, hafnium, titanium, alloys thereof, oxides thereof, nitrides thereof, and so forth. The powder is typically formed from a reduction process in which a tantalum salt (e.g., potassium fluotantalate ($K_2TaF_7$), sodium fluotantalate ($Na_2TaF_7$), tantalum pentachloride ($TaCl_5$), etc.) is reacted with a reducing agent. The reducing agent may be provided in the form of a liquid, gas (e.g., hydrogen), or solid, such as a metal (e.g., sodium), metal alloy, or metal salt. In one embodiment, for instance, a tantalum salt (e.g., $TaCl_5$) may be heated at a temperature of from about 900° C. to about 2,000° C., in some embodiments from about 1,000° C. to about 1,800° C., and in some embodiments, from about 1,100° C. to about 1,600° C., to form a vapor that can be reduced in the presence of a gaseous reducing agent (e.g., hydrogen). The vapor may be passed through a reaction site at a rate of from about 0.05 to about 5.0 $g/cm^2$*min, and in some embodiments from about 0.1 to about 3.0 $g/cm^2$*min, so that the it is retained within the reduction reaction site for a time period of from about 0.1 to about 5 seconds, and in some embodiments, from about 0.5 to about 3 seconds. Suitable reactors may include, for instance, vertical tube furnaces, rotary kilns, fluid bed furnaces, multiple hearth furnaces, self-propagation high-temperature synthesis reactors, etc. The reactor may be maintained under inert gas (e.g., argon) until that the mass in the reaction vessel is cooled to ambient temperature. Additional details of such a reduction reaction may be described in WO 2014/199480 to Maeshima, et al. After the reduction, the product may be cooled, crushed, and washed to form a powder.

Phosphorous dopants are not typically employed during formation of the powder as is often employed in many conventional anodes. Thus, the powder (as well as the anode) may have a relatively phosphorous content. For example, the powder may have no more than about 150 ppm of phosphorous, in some embodiments no more than about 100 ppm of phosphorous, in some embodiments no more than about 50 ppm phosphorous, and in some embodiments, no more than about 10 ppm of phosphorous. It has been discovered that powders formed with such a low amount of phosphorous dopants can exhibit a higher degree of shrinkage during sintering. Contrary to conventional thought, the higher shrinkage can help increase pore formation in the anode, which enhances the degree to which the solid electrolyte is able to be impregnated within the structure of the anode body.

The resulting powder may be a free-flowing, finely divided powder that contains primary particles. As indicated above, the primary particles of the powder generally have a median size (D50) of from about 5 to about 250 nanometers, in some embodiments from about 10 to about 200 nanometers, and in some embodiments, from about 20 to about 150 nanometers, such as determined using a laser particle size distribution analyzer made by BECKMAN COULTER Corporation (e.g., LS-230), optionally after subjecting the particles to an ultrasonic wave vibration of 70 seconds. The primary particles typically have a three-dimensional granular shape (e.g., nodular or angular). Such particles typically have a relatively low "aspect ratio", which is the average diameter or width of the particles divided by the average thickness ("D/T"). For example, the aspect ratio of the particles may be about 4 or less, in some embodiments about 3 or less, and in some embodiments, from about 1 to about 2. In addition to primary particles, the powder may also contain other types of particles, such as secondary particles formed by aggregating (or agglomerating) the primary particles. Such secondary particles may have a median size (D50) of from about 1 to about 500 micrometers, and in some embodiments, from about 10 to about 250 micrometers.

Typically, agglomeration of the particles occurs without a significant degree of heating. Among other things, such "cool" agglomeration can further enhance pore formation, which even further enhances the degree to which the solid electrolyte is able to be impregnated within the anode body. More particularly, agglomeration may occur at a temperature of from about 0° C. to about 40° C., in some embodiments from about 5° C. to about 35° C., and in some embodiments, from about 15° C. to about 30° C. Rather than employing a significant degree of heat, the particles may instead be agglomerated with the aid of a binder. Suitable binders may include, for instance, poly(vinyl butyral); poly (vinyl acetate); poly(vinyl alcohol); poly(vinyl pyrollidone); cellulosic polymers, such as carboxymethylcellulose, methyl cellulose, ethyl cellulose, hydroxyethyl cellulose, and methylhydroxyethyl cellulose; atactic polypropylene, polyethylene; polyethylene glycol (e.g., Carbowax from Dow Chemical Co.); polystyrene, poly(butadiene/styrene); polyamides, polyimides, and polyacrylamides, high molecular weight polyethers; copolymers of ethylene oxide and propylene oxide; fluoropolymers, such as polytetrafluoroethylene, polyvinylidene fluoride, and fluoro-olefin copolymers; acrylic polymers, such as sodium polyacrylate, poly (lower alkyl acrylates), poly(lower alkyl methacrylates) and copolymers of lower alkyl acrylates and methacrylates; and fatty acids and waxes, such as stearic and other soapy fatty acids, vegetable wax, microwaxes (purified paraffins), etc.

The resulting powder may be compacted to form a pellet using any conventional powder press device. For example, a press mold may be employed that is a single station compaction press containing a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode lead wire. The wire may be formed from any electrically conductive material, such as tantalum, niobium, aluminum, hafnium, titanium, etc., as well as electrically conductive oxides and/or nitrides of thereof.

Any binder may be removed after pressing by heating the pellet under vacuum at a certain temperature (e.g., from about 150° C. to about 500° C.) for several minutes. Alternatively, the binder may also be removed by contacting the pellet with an aqueous solution, such as described in U.S. Pat. No. 6,197,252 to Bishop, et al. Thereafter, the pellet is sintered to form a porous, integral mass. The pellet is typically sintered at a temperature of from about 700° C. to about 1600° C., in some embodiments from about 800° C. to about 1500° C., and in some embodiments, from about 900° C. to about 1200° C., for a time of from about 5 minutes to about 100 minutes, and in some embodiments, from about 8 minutes to about 15 minutes. This may occur in one or more steps. If desired, sintering may occur in an atmosphere that limits the transfer of oxygen atoms to the anode. For example, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed.

Upon sintering, the pellet shrinks due to the growth of metallurgical bonds between the particles. Because shrinkage generally increases the density of the pellet, lower press densities ("green") may be employed to still achieve the desired target density. For example, the target density of the pellet after sintering is typically from about 5 to about 8 grams per cubic centimeter. As a result of the shrinking phenomenon, however, the pellet need not be pressed to such high densities, but may instead be pressed to densities of less than about 6.0 grams per cubic centimeter, and in some embodiments, from about 4.5 to about 5.5 grams per cubic centimeter. Among other things, the ability to employ lower green densities may provide significant cost savings and increase processing efficiency.

An anode lead may also be connected to the anode body that extends in a longitudinal direction therefrom. The anode lead may be in the form of a wire, sheet, etc., and may be formed from a valve metal compound, such as tantalum, niobium, niobium oxide, etc. Connection of the lead may be accomplished using known techniques, such as by welding the lead to the body or embedding it within the anode body during formation (e.g., prior to compaction and/or sintering).

B. Dielectric Layer

As indicated above, the anode also contains a dielectric layer formed by anodically oxidizing ("anodizing") the sintered anode pellet. For example, a tantalum (Ta) anode may be anodized to tantalum pentoxide ($Ta_2O_5$). Typically, anodization is performed by initially applying an electrolyte to the pellet, such as by dipping the pellet into the electrolyte. A current is thereafter passed through the electrolyte to form the dielectric layer in the manner described above. The temperature at which the anodic oxidation occur is typically from about 10° C. to about 200° C., in some embodiments from about 20° C. to about 150° C., and in some embodiments, from about 25° C. to about 90° C. The forming voltage employed during anodization is generally about 2 volts or more, in some embodiments about 6 volts or more, and in some embodiments, from about 8 to about 15 volts. The anodic oxidation process may occur in one or multiple stages. If desired, the dielectric layer may optionally be annealed during the anodic oxidation process. The temperature at which annealing occur is typically from about 220° C. to about 350° C., in some embodiments from about 250° C. to about 320° C., and in some embodiments, from about 260° C. to about 300° C. The electrolyte employed during anodic oxidation is generally in the form of a liquid, such as a solution (e.g., aqueous or non-aqueous), dispersion, melt, etc. The electrolyte is electrically conductive and may have an electrical conductivity of about 1 milliSiemens per centimeter ("mS/cm") or more, in some embodiments about 10 mS/cm or more, and in some embodiments, from about 20 mS/cm to about 100 mS/cm, determined at a temperature of 25° C. To enhance the electrical conductivity of the electrolyte, an ionic compound may be employed that is capable of dissociating in the solvent to form ions. In certain embodiments of the present invention, the ionic compound is a phosphorous-based acid, such as phosphoric acid, polyphosphoric acid, etc. For example, such phosphorous-based acids (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the electrolyte.

A solvent is also typically employed in the electrolyte, such as water (e.g., deionized water); ethers (e.g., diethyl ether and tetrahydrofuran); alcohols (e.g., methanol, ethanol, n-propanol, isopropanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. The solvent may constitute from about 50 wt. % to about 99.9 wt. %, in some embodiments from about 75 wt. % to about 99 wt. %, and in some embodiments, from about 80 wt. % to about 95 wt. % of the electrolyte. Although not necessarily required, the use of an aqueous solvent (e.g., water) is often desired to facilitate formation of an oxide. In fact, water may constitute about 1 wt. % or more, in some embodiments about 10 wt. % or more, in some embodiments about 50 wt. % or more, in some embodiments about 70 wt. % or more, and in some embodiments, about 90 wt. % to 100 wt. % of the solvent(s) used in the electrolyte.

C. Solid Electrolyte

As indicated above, a solid electrolyte overlies the dielectric that generally functions as the cathode. In some embodiments, the solid electrolyte may include a manganese dioxide. If the solid electrolyte includes manganese dioxide, the manganese dioxide solid electrolyte may, for instance, be formed by the pyrolytic decomposition of manganese nitrate ($Mn(NO_3)_2$). Such techniques are described, for instance, in U.S. Pat. No. 4,945,452 to Sturmer, et al.

In other embodiments, the solid electrolyte contains a conductive polymer, which is typically π-conjugated and has electrical conductivity after oxidation or reduction, such as an electrical conductivity of at least about 1 µS/cm. Examples of such π-conjugated conductive polymers include, for instance, polyheterocycles (e.g., polypyrroles, polythiophenes, polyanilines, etc.), polyacetylenes, poly-p-phenylenes, polyphenolates, and so forth. In one embodiment, for example, the polymer is a substituted polythiophene, such as those having the following general structure:

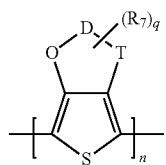

wherein,

T is O or S;

D is an optionally substituted $C_1$ to $C_5$ alkylene radical (e.g., methylene, ethylene, n-propylene, n-butylene, n-pentylene, etc.);

$R_7$ is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and q is an integer from 0 to 8, in some embodiments, from 0 to 2, and in one embodiment, 0; and n is from 2 to 5,000, in some embodiments from 4 to 2,000, and in some embodiments, from 5 to 1,000. Example of substituents for the radicals "D" or "$R_7$" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

Particularly suitable thiophene polymers are those in which "D" is an optionally substituted $C_2$ to $C_3$ alkylene radical. For instance, the polymer may be optionally substituted poly(3,4-ethylenedioxythiophene), which has the following general structure:

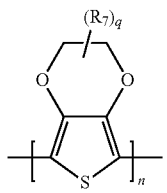

Methods for forming conductive polymers, such as described above, are well known in the art. For instance, U.S. Pat. No. 6,987,663 to Merker, et al., describes various techniques for forming substituted polythiophenes from a monomeric precursor. The monomeric precursor may, for instance, have the following structure:

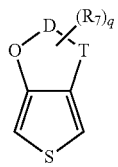

wherein,

T, D, $R_7$, and q are defined above. Particularly suitable thiophene monomers are those in which "D" is an optionally substituted $C_2$ to $C_3$ alkylene radical. For instance, optionally substituted 3,4-alkylenedioxythiophenes may be employed that have the general structure:

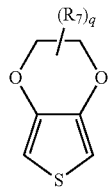

wherein, $R_7$ and q are as defined above. In one particular embodiment, "q" is 0. One commercially suitable example of 3,4-ethylenedioxthiophene is available from Heraeus Clevios under the designation Clevios™ M. Other suitable monomers are also described in U.S. Pat. No. 5,111,327 to Blohm, et al. and 6,635,729 to Groenendaal, et al. Derivatives of these monomers may also be employed that are, for example, dimers or trimers of the above monomers. Higher molecular derivatives, i.e., tetramers, pentamers, etc. of the monomers are suitable for use in the present invention. The derivatives may be made up of identical or different monomer units and used in pure form and in a mixture with one another and/or with the monomers. Oxidized or reduced forms of these precursors may also be employed.

Various methods may be utilized to form the conductive polymer layer. For example, an in situ polymerized layer may be formed by chemically polymerizing monomers in the presence of an oxidative catalyst. The oxidative catalyst typically includes a transition metal cation, such as iron(III), copper(II), chromium(VI), cerium(IV), manganese(IV), manganese(VII), or ruthenium(III) cations, and etc. A dopant may also be employed to provide excess charge to the conductive polymer and stabilize the conductivity of the polymer. The dopant typically includes an inorganic or organic anion, such as an ion of a sulfonic acid. In certain embodiments, the oxidative catalyst has both a catalytic and doping functionality in that it includes a cation (e.g., transition metal) and an anion (e.g., sulfonic acid). For example, the oxidative catalyst may be a transition metal salt that includes iron(III) cations, such as iron(III) halides (e.g., $FeCl_3$) or iron(III) salts of other inorganic acids, such as $Fe(ClO_4)_3$ or $Fe_2(SO_4)_3$ and the iron(III) salts of organic acids and inorganic acids comprising organic radicals. Examples of iron (III) salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of iron(III) salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned iron(III) salts may also be used. Iron(III)-p-toluene sulfonate, iron(III)-o-toluene sulfonate, and mixtures thereof, are particularly suitable. One commercially suitable example of iron(III)-p-toluene sulfonate is available from Heraeus Clevios under the designation Clevios™ C.

The oxidative catalyst and monomer may be applied either sequentially or together to initiate the polymerization reaction. Suitable application techniques for applying these components include screen-printing, dipping, electrophoretic coating, and spraying. As an example, the monomer may initially be mixed with the oxidative catalyst to form a precursor solution. Once the mixture is formed, it may be applied to the anode part and then allowed to polymerize so that a conductive coating is formed on the surface. Alternatively, the oxidative catalyst and monomer may be applied sequentially. In one embodiment, for example, the oxidative catalyst is dissolved in an organic solvent (e.g., butanol) and then applied as a dipping solution. The anode part may then be dried to remove the solvent therefrom. Thereafter, the part may be dipped into a solution containing the monomer. Regardless, polymerization is typically performed at temperatures of from about −10° C. to about 250° C., and in some embodiments, from about 0° C. to about 200° C., depending on the oxidizing agent used and desired reaction time. Suitable polymerization techniques, such as described above, may be described in more detail in U.S. Pat. No. 7,515,396 to Biler. Still other methods for applying such conductive coating(s) may be described in U.S. Pat. Nos. 5,457,862 to Sakata et al., 5,473,503 to Sakata, et al., 5,729,428 to Sakata, et al., and 5,812,367 to Kudoh, et al.

In addition to in situ application, the conductive polymer solid electrolyte may also be applied in the form of a dispersion of conductive polymer particles. One benefit of employing a dispersion is that it may minimize the presence of ionic species (e.g., $Fe^{2+}$ or $Fe^{3+}$) produced during in situ polymerization, which can cause dielectric breakdown under high electric field due to ionic migration. Thus, by applying the conductive polymer as a dispersion rather through in situ polymerization, the resulting capacitor may exhibit a relatively high "breakdown voltage." To enable good impregnation of the anode, the particles employed in the dispersion typically have a small size, such as an average size (e.g., diameter) of from about 1 to about 150 nanometers, in some embodiments from about 2 to about 50 nanometers, and in some embodiments, from about 5 to about 40 nanometers. The diameter of the particles may be determined using known techniques, such as by ultracentrifuge, laser diffraction, etc. The shape of the particles may likewise vary. In one particular embodiment, for instance, the particles are spherical in shape. However, it should be understood that other shapes are also contemplated by the present invention, such as plates, rods, discs, bars, tubes, irregular shapes, etc. The concentration of the particles in the dispersion may vary depending on the desired viscosity of the dispersion and the particular manner in which the dispersion is to be applied to the capacitor. Typically, however, the particles constitute from about 0.1 to about 10 wt. %, in some embodiments from about 0.4 to about 5 wt. %, and in some embodiments, from about 0.5 to about 4 wt. % of the dispersion.

The dispersion also generally contains a counterion that enhances the stability of the particles. That is, the conductive polymer (e.g., polythiophene or derivative thereof) typically has a charge on the main polymer chain that is neutral or positive (cationic). Polythiophene derivatives, for instance, typically carry a positive charge in the main polymer chain. In some cases, the polymer may possess positive and negative charges in the structural unit, with the positive charge being located on the main chain and the negative charge optionally on the substituents of the radical "R", such as sulfonate or carboxylate groups. The positive charges of the main chain may be partially or wholly saturated with the optionally present anionic groups on the radicals "R."

Viewed overall, the polythiophenes may, in these cases, be cationic, neutral or even anionic. Nevertheless, they are all regarded as cationic polythiophenes as the polythiophene main chain has a positive charge.

The counterion may be a monomeric or polymeric anion that counteracts the charge of the conductive polymer. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

When employed, the weight ratio of such counterions to conductive polymers in the dispersion and in the resulting layer is typically from about 0.5:1 to about 50:1, in some embodiments from about 1:1 to about 30:1, and in some embodiments, from about 2:1 to about 20:1. The weight of the electrically conductive polymers corresponds referred to the above-referenced weight ratios refers to the weighed-in portion of the monomers used, assuming that a complete conversion occurs during polymerization. In addition to conductive polymer(s) and counterion(s), the dispersion may also contain one or more binders, dispersion agents, fillers, adhesives, crosslinking agents, etc.

The polymeric dispersion may be applied using a variety of known techniques, such as by spin coating, impregnation, pouring, dropwise application, injection, spraying, doctor blading, brushing, printing (e.g., ink-jet, screen, or pad printing), or dipping. Although it may vary depending on the application technique employed, the viscosity of the dispersion is typically from about 0.1 to about 100,000 mPas (measured at a shear rate of 100 $s^{-1}$), in some embodiments from about 1 to about 10,000 mPas, in some embodiments from about 10 to about 1,500 mPas, and in some embodiments, from about 100 to about 1000 mPas. Once applied, the layer may be dried and/or washed. One or more additional layers may also be formed in this manner to achieve the desired thickness. Typically, the total thickness of the layer(s) formed by this particle dispersion is from about 1 to about 50 μm, and in some embodiments, from about 5 to about 20 μm. The weight ratio of counterions to conductive polymers is likewise from about 0.5:1 to about 50:1, in some embodiments from about 1:1 to about 30:1, and in some embodiments, from about 2:1 to about 20:1.

If desired, a hydroxyl-functional nonionic polymer may also be included in the solid electrolyte. The term "hydroxy-functional" generally means that the compound contains at least one hydroxyl functional group or is capable of possessing such a functional group in the presence of a solvent. Without intending to be limited by theory, it is believed that hydroxy-functional nonionic polymers can improve the degree of contact between the conductive polymer and the surface of the internal dielectric, which is typically relatively smooth in nature as a result of higher forming voltages. This unexpectedly increases the breakdown voltage and wet-to-dry capacitance of the resulting capacitor. Furthermore, it is believed that the use of a hydroxy-functional polymer with a certain molecular weight can also minimize the likelihood of chemical decomposition at high voltages. For instance, the molecular weight of the hydroxy-functional polymer may be from about 100 to 10,000 grams per mole, in some embodiments from about 200 to 2,000, in some embodiments from about 300 to about 1,200, and in some embodiments, from about 400 to about 800.

Any of a variety of hydroxy-functional nonionic polymers may generally be employed for this purpose. In one embodiment, for example, the hydroxy-functional polymer is a polyalkylene ether. Polyalkylene ethers may include polyalkylene glycols (e.g., polyethylene glycols, polypropylene glycols polytetramethylene glycols, polyepichlorohydrins, etc.), polyoxetanes, polyphenylene ethers, polyether ketones, and so forth. Polyalkylene ethers are typically predominantly linear, nonionic polymers with terminal hydroxy groups. Particularly suitable are polyethylene glycols, polypropylene glycols and polytetramethylene glycols (polytetrahydrofurans), which are produced by polyaddition of ethylene oxide, propylene oxide or tetrahydrofuran onto water. The polyalkylene ethers may be prepared by polycondensation reactions from diols or polyols. The diol component may be selected, in particular, from saturated or unsaturated, branched or unbranched, aliphatic dihydroxy compounds containing 5 to 36 carbon atoms or aromatic dihydroxy compounds, such as, for example, pentane-1,5-diol, hexane-1,6-diol, neopentyl glycol, bis-(hydroxymethyl)-cyclohexanes, bisphenol A, dimer diols, hydrogenated dimer diols or even mixtures of the diols mentioned. In addition, polyhydric alcohols may also be used in the polymerization reaction, including for example glycerol, di- and polyglycerol, trimethylolpropane, pentaerythritol or sorbitol.

In addition to those noted above, other hydroxy-functional nonionic polymers may also be employed in the present invention. Some examples of such polymers include, for instance, ethoxylated alkylphenols; ethoxylated or propoxylated $C_6$-$C_{24}$ fatty alcohols; polyoxyethylene glycol alkyl ethers having the general formula: $CH_3$—$(CH_2)_{10-16}$—$(O$—$C_2H_4)_{1-25}$—OH (e.g., octaethylene glycol monododecyl ether and pentaethylene glycol monododecyl ether); polyoxypropylene glycol alkyl ethers having the general formula: $CH_3$—$(CH_2)_{10-16}$—$(O$—$C_3H_6)_{1-25}$—OH; polyoxyethylene glycol octylphenol ethers having the following general formula: $C_8H_{17}$—$(C_6H_4)$—$(O$—$C_2H_4)_{1-25}$—OH (e.g., Triton™ X-100); polyoxyethylene glycol alkylphenol ethers having the following general formula: $C_9H_{19}$—$(C_6H_4)$—$(O$—$C_2H_4)_{1-25}$—OH (e.g., nonoxynol-9); polyoxyethylene glycol esters of $C_8$-$C_{24}$ fatty acids, such as polyoxyethylene glycol sorbitan alkyl esters (e.g., polyoxyethylene (20) sorbitan monolaurate, polyoxyethylene (20) sorbitan monopalmitate, polyoxyethylene (20) sorbitan monostearate, polyoxyethylene (20) sorbitan monooleate, PEG-20 methyl glucose distearate, PEG-20 methyl glucose sesquistearate, PEG-80 castor oil, and PEG-20 castor oil, PEG-3 castor oil, PEG 600 dioleate, and PEG 400 dioleate) and polyoxyethylene glycerol alkyl esters (e.g., polyoxyethylene-23 glycerol laurate and polyoxyethylene-20 glycerol stearate); polyoxyethylene glycol ethers of $C_8$-$C_{24}$ fatty acids (e.g., polyoxyethylene-10 cetyl ether, polyoxyethylene-10 stearyl ether, polyoxyethylene-20 cetyl ether, polyoxyethylene-10 oleyl ether, polyoxyethylene-20 oleyl ether, polyoxyethylene-20 isohexadecyl ether, polyoxyethylene-15 tridecyl ether, and polyoxyethylene-6 tridecyl ether); block copolymers of polyethylene glycol and polypropylene glycol (e.g., Poloxamers); and so forth, as well as mixtures thereof.

The hydroxy-functional nonionic polymer may be incorporated into the solid electrolyte in a variety of different ways. In certain embodiments, for instance, the nonionic polymer may simply be incorporated into any conductive polymer layer(s) formed by a method as described above (e.g., in situ polymerization or pre-polymerized particle dispersion). In other embodiments, however, the nonionic polymer may be applied after the initial polymer layer(s) are formed.

D. External Polymer Coating

Although not required, an external polymer coating may be applied to the anode body and overlie the solid electrolyte. The external polymer coating generally contains one or more layers formed from a dispersion of pre-polymerized conductive particles, such as described in more detail above. The external coating may be able to further penetrate into the edge region of the capacitor body to increase the adhesion to the dielectric and result in a more mechanically robust part, which may reduce equivalent series resistance and leakage current. If desired, a crosslinking agent may also be employed in the external polymer coating to enhance the degree of adhesion to the solid electrolyte. Typically, the crosslinking agent is applied prior to application of the dispersion used in the external coating. Suitable crosslinking agents are described, for instance, in U.S. Patent Publication No. 2007/0064376 to Merker, et al. and include, for instance, amines (e.g., diamines, triamines, oligomer amines, polyamines, etc.); polyvalent metal cations, such as salts or compounds of Mg, Al, Ca, Fe, Cr, Mn, Ba, Ti, Co, Ni, Cu, Ru, Ce or Zn, phosphonium compounds, sulfonium compounds, etc.

E. Other Components

If desired, the capacitor element may also contain other layers as is known in the art. For example, an adhesion coating may be employed between the dielectric layer and the solid electrolyte. The adhesion coating may be a discontinuous precoat layer, which includes a plurality of discrete nanoprojections of a manganese oxide (e.g., manganese dioxide) that can penetrate into the small pores of the anode body and ultimately become embedded into the inner solid electrolyte layer. Because the precoat layer is formed as discrete nanoprojections rather than as a continuous layer, the solid electrolyte (e.g., conductive polymer) may be able to directly contact a substantial portion of the dielectric, either directly or through contact with another layer, such as described below. The relatively large degree of contact between the inner solid electrolyte layer and dielectric can even further reduce ESR. To accomplish the desired result without adversely impacting the overall performance of the capacitor, the average size (e.g., diameter) of the nanoprojections is typically large enough so that an improvement in adhesion is achieved, but yet not so large that they are incapable of penetrating into the pores of the anode. In this regard, the nanoprojections typically have an average size of from about 5 nanometers to about 500 nanometers, in some embodiments from about 6 nanometers to about 250 nanometers, in some embodiments, from about 8 nanometers to about 150 nanometers, and in some embodiments, from about 10 nanometers to about 110 nanometers. The term "average diameter" may, for example, refer to the average value for the major axis of the nanoprojections when viewed from above (the maximum diameter). Such diameters may be obtained, for example, using known techniques, such as photon correlation spectroscopy, dynamic light scattering, quasi-elastic light scattering, etc. Various particle size analyzers may be employed to measure the diameter in this manner. One particular example is a Corouan VASCO 3 Particle Size Analyzer. Although not necessarily required, the nanoprojections may also have a narrow size distribution, which may further improve the properties of the capacitor. For instance, about 50% or more, in some embodiments about 70% or more, and in some embodiments, about 90% or more of the nanoprojections may have an average size within the ranges noted above. The number of nanoprojections having a certain size may be determined using the techniques noted above, wherein the percent volume can be correlated to the number of particles having a certain absorbance unit ("au").

In addition to their size, the surface coverage of the nanoprojections on the dielectric may also be selectively controlled to help achieve the desired electrical performance. That is, too small of a surface coverage may limit the ability to the conductive polymer layer to better adhere to the dielectric, but too large of a coverage may adversely impact the ESR of the capacitor. In this regard, the surface coverage of the nanoprojections is typically from about 0.1% to about 40%, in some embodiments from about 0.5% to about 30%, and in some embodiments, from about 1% to about 20%. The degree of surface coverage may be calculated in a variety of ways, such as by dividing the "actual capacitance" value by the "normal capacitance" value and then multiplying by 100. The "normal capacitance" is determined after forming the nanoprojections and then impregnating the anode with the conductive polymer solution, while the "actual capacitance" is determined after forming the nanoprojections, impregnating the anode with the conductive polymer solution, washing the conductive polymer solution from the interior of the anode, and then drying the anode to remove moisture.

A variety of different techniques may be employed to form the precoat layer of the present invention. As is known in the art, manganese oxides (e.g., manganese dioxide) are typically formed through pyrolytic decomposition of a precursor (e.g., manganese nitrate ($Mn(NO_3)_2$)). For example, a dielectric-coated anode body may be contacted with a solution (e.g., dipped, immersed, sprayed, etc.) that contains the precursor and thereafter heated for conversion into the oxide. If desired, multiple application steps may be employed. The amount of time in which the anode body is in contact with a manganese oxide precursor solution may vary as desired. For example, the anode body may be dipped into such a solution for a period of time ranging from about 10 seconds to about 10 minutes.

The manganese oxide precursor solution may optionally contain a surfactant. Such a surfactant can reduce surface tension and thereby improve penetration of the solution into the interior of the anode body. Particularly suitable are nonionic surfactants, such as a polyglycol ether (e.g., polyoxyethylene alkyl ether), nonylphenoxypoly-(ethyleneoxy) ethanol (e.g., Igepal CO-630); isooctylphenoxy-polyethoxyethanol (e.g., Triton X-100), benzyletheroctylphenolethylene oxide condensate (e.g., Triton CF-10), 3,6-dimethyl-4-octyne-3,6-diol (e.g., Surfynol 82), and so forth. To achieve the desired improvement in the impregnation of the manganese oxide precursor without adversely impacting other characteristics of the capacitor, it is generally desired that the concentration of the surfactant is selectively controlled within a certain range. For example, the solution into which the anode body is dipped may contain the surfactant in an amount of from about 0.01 wt. % to about 30 wt. %, in some embodiments from about 0.05 wt. % to about 25 wt. %, and in some embodiments, from about 0.1 wt. % to about 20 wt. %. The precursor(s) (e.g., manganese nitrate) may likewise constitute from about 1 wt. % to about 55 wt. % in some embodiments from about 2 wt. % to about 15 wt. %, and in some embodiments, from about 5 wt. % to about 10 wt. %, of the solution. A carrier, such as water, may also be employed in the solution. Aqueous solutions of the present invention may, for instance, contain water in an amount of from about 30 wt. % to about 95 wt. %, in some embodiments from about 40 wt. % to about 99 wt. % and in some embodiments, from about 50 wt. % to about 95 wt. %. It should be understood that the actual amounts of the components in the solution may vary depending upon such factors as the particle size and distribution of particles in the anode, the temperature at which decomposition is performed, the identity of the dispersant, the identity of the carrier, etc.

If desired, the anode body may be contacted with a humidified atmosphere in a pretreatment step that occurs prior to contact with a manganese oxide precursor solution. The presence of a certain amount of water vapor can slow the thermal decomposition reaction of manganese dioxide, thereby causing it to form as dispersed nanoprojections. For example, during the pretreatment step, the anode body can be exposed to an atmosphere having a humidity level of from about 1 to about 30 grams of water per cubic meter of air ($g/m^3$), in some embodiments from about 4 to about 25 $g/m^3$, and in some embodiments, from about 5 to about 20 $g/m^3$. The relative humidity may likewise range from about 30% to about 90%, in some embodiments from about 40% to about 85%, and in some embodiments, from about 50% to about 80%. The temperature of the humidified atmosphere may vary, such as from about 10° C. to about 50° C., in some embodiments from about 15° C. to about 45° C., and in some embodiments, from about 20° C. to about 40° C. In addition to a pretreatment step, the anode body may also be contacted with a humidified atmosphere in an intermediate treatment step, which occurs after contact with a manganese oxide precursor solution. The humidified atmosphere in the intermediate treatment step may have the same or different conditions than that of the pretreatment step, but is generally within the ranges noted above.

Regardless, once contacted with the precursor solution for the desired amount of time, the part is heated to a temperature sufficient to pyrolytically convert the precursor (e.g., manganese nitrate) to an oxide. Heating may occur, for instance, in a furnace at a temperature of from about 150° C. to about 300° C., in some embodiments from about 180° C. to about 290° C., and in some embodiments, from about 190° C. to about 260° C. Heating may be conducted in a moist or dry atmosphere. In certain embodiments, for instance, heating may be conducted in a humidified atmosphere, which may be the same or different than the atmospheres used in the aforementioned pretreatment and intermediate treatment steps, but generally within the conditions noted above. The time for the conversion depends on the furnace temperature, heat transfer rate and atmosphere, but generally is from about 3 to about 5 minutes. After pyrolysis, the leakage current may sometimes be high due to damage suffered by the dielectric film during the deposition of the manganese dioxide. To reduce this leakage, the capacitor may be reformed in an anodization bath as is known in the art. For example, the capacitor may be dipped into an electrolyte such as described above and then subjected to a DC current.

If desired, the adhesive coating may also contain other layers to help reduce the likelihood of delamination. In one embodiment, for example, the adhesive coating may include a resinous layer, which may be continuous or discontinuous in nature. When employed, the particular arrangement of the resinous layer relative to the precoat layer may vary as desired. In one embodiment, for instance, the precoat layer may be initially formed on the dielectric, and the resinous layer may thereafter be applied to the coated dielectric. In such embodiments, the precoat layer overlies the dielectric and the resinous layer overlies the precoat layer and may contact the precoat layer and/or the dielectric. Despite the presence of the resinous layer, it is believed that the coated nanoprojections of the precoat layer are still capable of becoming embedded within the inner conducive polymer layer. In another embodiment, the resinous layer may be initially applied to the dielectric, and the precoat layer may thereafter be formed thereon. In such embodiments, the resinous layer overlies the dielectric and the precoat layer overlies the resinous layer.

The resinous layer may generally include a natural or synthetic resin, which may be a solid or semi-solid material that is polymeric in nature or capable of being polymerized, cured, or otherwise hardened. It is also typically desired that the resin is relatively insulative in nature. As used herein, the term "relatively insulative" generally means more resistive than the conductive polymer that primarily forms the inner conductive polymer layer. For example, in some embodiments, a relatively insulative resin can have a resistivity at 20° C. of about 1000 Ω-cm or more, in some embodiments about 10,000 Ω-cm or more, in some embodiments about $1 \times 10^5$ Ω-cm or more, and in some embodiments, about $1 \times 10^{10}$ Ω-cm or more. Some examples of suitable resins that may be employed include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. Shellac, which is believed to contain esters of various aliphatic and alicyclic hydroxy acids (e.g., aleuritic acid and shellolic acid), is particularly suitable. These and other resin materials are described in more detail in U.S. Pat. No. 6,674,635 to Fife, et al.

When employed, the esters of fatty acids, such as described above, may exist naturally or be refined from natural materials. For example, soybean oil is often obtained from soybeans through refinement by solvent extraction with petroleum hydrocarbons or using continuous screw press operations. Upon extraction, the obtained soybean oil is primarily constituted of triglycerides of oleic acid, linoleic acid, and linolenic acid. Tung oil, on the other hand, is a drying oil that often requires no such refinement. In some instances, it may be desired to initiate further esterification of a fatty acid mixture by reacting an alcohol therewith. Such fatty acid/alcohol ester derivatives may generally be obtained using any known alcohol capable of reacting with a fatty acid. For example, in some embodiments, monohydric and/or polyhydric alcohols with less than 8 carbon atoms, and in some embodiments, less than 5 carbon atoms, may be used in the present invention. Specific embodiments of the present invention include the use of methanol, ethanol, butanol, as well as various glycols, such as propylene glycol, hexylene glycol, etc. In one particular embodiment, shellac can be esterified by mixing it with an alcohol, such as described above. Specifically, shellac is a resinous excretion of an insect that is believed to contain a complex mixture of fatty acids that, to some extent, are esterified. Thus, when mixed with an alcohol, the fatty acid groups of the shellac are further esterified by reaction with the alcohol.

A resinous layer can be formed in a variety of different ways. For example, in one embodiment, the anode can be dipped into a solution of the desired resin(s). The solution can be formed by dissolving the selected protective resin into a solvent, such as water or a non-aqueous solvent. Some suitable non-aqueous solvents can include, but are not limited to, methanol, ethanol, butanol, as well as various glycols, such as propylene glycol, hexylene glycol, di(ethylene acetate) glycol, etc. Particularly desired non-aqueous solvents are those having a boiling point greater than about 80° C., in some embodiments greater than about 120° C., and in some embodiments, greater than about 150° C. As described above, the formation of a solution using a non-aqueous solvent may also lead to further esterification of fatty acids when such resinous materials are utilized. The anode can be dipped into the solution one or more times, depending on the desired thickness. For example, in some embodiments, multiple resinous layers may be employed, such as 2 to 10 layers, and in some embodiments, from 3 to 7 layers. Each layer may have a target thickness of, for instance, about 100 nanometers or less, in some embodiments about 30 nanometers or less, and in some embodiments, about 10 nanometers or less. Besides dipping, it should also be understood that other conventional application methods, such as sputtering, screen printing, electrophoretic coating, electron beam deposition, vacuum deposition, spraying, and the like, can also be used.

After forming the resinous layer, the anode part may be heated or otherwise cured. Heating can facilitate evaporation of any solvent used during application, and may also aid in the esterification and/or polymerization of the resinous materials. To facilitate esterification and/or polymerization, curing agents may also be added to the resinous layer. For instance, one example of a curing agent that can be used with shellac is sulfuric acid. The time and temperature at which heating occurs generally varies depending on the specific resinous materials utilized. Typically, each layer is dried at a temperature ranging from about 30° C. to about 300° C., and in some embodiments, from about 50° C. to about 150° C., for a time period ranging from about 1 minute to about 60 minutes, and in some embodiments, from about 15 minutes to about 30 minutes. It should also be understood that heating need not be utilized after application of each resinous layer.

II. Terminations

The capacitor may also be provided with terminations, particularly when employed in surface mounting applications. For example, the capacitor may contain an anode termination to which the anode of the capacitor element is electrically connected and a cathode termination to which the cathode of the capacitor element is electrically connected. Any conductive material may be employed to form the terminations, such as a conductive metal (e.g., copper, nickel, silver, nickel, zinc, tin, palladium, lead, copper, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The thickness of the terminations is generally selected to minimize the thickness of the capacitor. For instance, the thickness of the terminations may range from about 0.05 to about 1 millimeter, in some embodiments from about 0.05 to about 0.5 millimeters, and from about 0.07 to about 0.2 millimeters. One exemplary conductive material is a copper-iron alloy metal plate available from Wieland (Germany). If desired, the surface of the terminations may be electroplated with nickel, silver, gold, tin, etc. as is known in the art to ensure that the final part is mountable to the circuit board. In one particular embodiment, both surfaces of the terminations are plated with nickel and silver flashes, respectively, while the mounting surface is also plated with a tin solder layer.

Referring to FIG. 1, for example, an electrolytic capacitor 30 is shown as including an anode termination 62 and a cathode termination 72 in electrical connection with the capacitor element 33. The capacitor element 33 has an upper surface 37, lower surface 39, front surface 36, and rear surface 38. Although it may be in electrical contact with any of the surfaces of the capacitor element 33, the cathode termination 72 in the illustrated embodiment is in electrical contact with the lower surface 39 via a conductive adhesive (not shown). More specifically, the cathode termination 72 contains a first component 73 that is in electrical contact and generally parallel with the lower surface 39 of the capacitor element 33. The anode termination 62 likewise contains a first component 63 positioned substantially perpendicular to a second component 64. The first component 63 is in electrical contact and generally parallel with the lower surface 39 of the capacitor element 33. The second component 64 contains a region 51 that carries an anode lead 16. The region 51 may possess a "U-shape" to further enhance surface contact and mechanical stability of the lead 16.

The terminations may be connected to the capacitor element using any technique known in the art. In one embodiment, for example, a lead frame may be provided that defines the cathode termination 72 and anode termination 62. To attach the electrolytic capacitor element 33 to the lead frame, the conductive adhesive (not shown) may initially be applied to a surface of the cathode termination 72. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives may be described in U.S. Patent Publication No. 2006/0038304 to Osako, et al. Any of a variety of techniques may be used to apply the conductive adhesive to the cathode termination 72. Printing techniques, for instance, may be employed due to their practical and cost-saving benefits.

A variety of methods may generally be employed to attach the terminations to the capacitor. In one embodiment, for example, the second component 64 of the anode termination 62 is initially bent upward to the position shown in FIG. 1. Thereafter, the capacitor element 33 is positioned on the cathode termination 72 so that its lower surface 39 contacts the adhesive 90 and the anode lead 16 is received by the region 51. If desired, an insulating material (not shown), such as a plastic pad or tape, may be positioned between the lower surface 39 of the capacitor element 33 and the first component 63 of the anode termination 62 to electrically isolate the anode and cathode terminations.

The anode lead 16 is then electrically connected to the region 51 using any technique known in the art, such as mechanical welding, laser welding, conductive adhesives, etc. For example, the anode lead 16 may be welded to the anode termination 62 using a laser. Lasers generally contain resonators that include a laser medium capable of releasing photons by stimulated emission and an energy source that excites the elements of the laser medium. One type of suitable laser is one in which the laser medium consist of an aluminum and yttrium garnet (YAG), doped with neodymium (Nd). The excited particles are neodymium ions $Nd^{3+}$. The energy source may provide continuous energy to the laser medium to emit a continuous laser beam or energy discharges to emit a pulsed laser beam. Upon electrically connecting the anode lead 16 to the anode termination 62, the conductive adhesive may then be cured. For example, a heat press may be used to apply heat and pressure to ensure that the electrolytic capacitor element 33 is adequately adhered to the cathode termination 72 by the adhesive.

III. Casing

The capacitor element is generally encapsulated within a casing so that at least a portion of the anode and cathode terminations are exposed for mounting onto a circuit board. As shown in FIG. 1, for instance, the capacitor element 33 is encapsulated within a resinous casing 28 so that a portion of the anode termination 62 and a portion of the cathode termination 72 are exposed. The casing is typically formed from a thermoset resin. Examples of such resins include, for instance, epoxy resins, polyimide resins, melamine resins, urea-formaldehyde resins, polyurethane resins, phenolic resins, polyester resins, etc. Epoxy resins are also particularly suitable. Still other additives may also be employed, such as photoinitiators, viscosity modifiers, suspension aiding agents, pigments, stress reducing agents, non-conductive fillers, stabilizers, etc. For example, the non-conductive fillers may include inorganic oxide particles, such as silica, alumina, zirconia, magnesium oxide, iron oxide, copper oxide, zeolites, silicates, clays (e.g., smectite clay), etc., as well as composites (e.g., alumina-coated silica particles) and mixtures thereof.

The present invention may be better understood by reference to the following example.

Test Procedures

Capacitance and Dissipation Factor

The capacitance and dissipation factor may be measured using a Hewlett-Packard Precision LCR meter with a 1.5 volt DC bias at an operating frequency of 120 Hz and temperature of about 25° C. The "dry capacitance" refers to the capacitance of the part after application of the solid electrolyte, graphite, and silver layers, while the "wet capacitance" refers to the capacitance of the part after formation of the dielectric, measured in 30% sulfuric acid in reference to silver cathode with platinum black plating.

Equivalent Series Resistance (ESR)

Equivalence series resistance may be measured using a Keithley 3330 Precision LCZ meter with Kelvin Leads 1.5 volt DC bias and a 0.5 volt peak to peak sinusoidal signal. The operating frequency may be 100 kHz and the temperature may be about 25° C.

Leakage Current:

Leakage current ("DCL") may be measured using a leakage test set that measures leakage current at a temperature of about 25° C. and at the rated voltage (e.g., 6.3 V) after 60 seconds.

EXAMPLE

Various anode samples may be formed as follows.

Sample 1-1: A powder may be formed that has a specific charge of 300,000 μF*V/g without a phosphorous dopant. The primary particles may be agglomerated with a binder. The powder may be pressed into tantalum anodes of the designed size and weight. After pressing, binder may be removed by heat treatment at a temperature of 600° C. for 20 minutes under vacuum. After removing binder, the anode may be sintered at 1050° C. for 10 minutes under vacuum.

Sample 1-2: A powder may be formed that has a specific charge of 300,000 μF*V/g with 280 parts per million of a phosphorous dopant. The primary particles may be agglomerated under heat treatment. The powders may then be mixed with a benzoic acid binder (2%) and pressed into a tantalum anode of the designed size and weight. After pressing, binder may be removed by aqueous solution (50° C., pH=10 or more). The anode may be dipped into the aqueous solution for 120 minutes and then rinsed in deionized water for 75 minutes. After rinsing, the anode may be dried at 110° C. for 180 minutes, and thereafter sintered at 1050° C. for 10 minutes under vacuum.

Sample 1-3: A powder may be formed that has a specific charge of 300,000 μF*V/g with 240 parts per million of a phosphorous dopant. The powder may then be pressed and sintered in the manner described above for Sample 1-2.

Sample 1-1, 1-2 and 1-3 can be used to form anodes having a capacitance of 100 μF and rated voltage of 6.3 V (F98M case size). After sintering, the degree of shrinking of each of these anodes is as follows: Sample 1-1: 3.8%; Sample 1-2: 1.5%; and Sample 1-3: 2.1%. The anode samples may then be anodized under the following conditions:

Electrolyte: Phosphoric acid

Electrolyte Temp: 60° C.

Electrolyte Conductivity: 6.5 mS/cm

Voltage: 9.6V

Step 1: 1st anodization for 60 minutes

Step 2: Annealing at 320 degree for 10 minutes or more

Step 3: 2nd anodization for 240 minutes

After the anodization process, a manganese dioxide cathode may be formed and the anodes may then be finished using a conventional assembly process to form a capacitor. Twelve (12) capacitor samples may be formed from each anode sample. Representative electrical properties (average) for such capacitors are provided below.

| Average Value | Sample 1-1 | Sample 1-2 | Sample 1-3 |
|---|---|---|---|
| Dry-Wet Cap change (%) | 18.2 | 26.0 | 37.5 |
| Wet-to-Dry Capacitance (%) | 81.8 | 74.0 | 62.5 |
| Dissipation Factor (%) | 58.9 | 77.4 | 65.1 |
| ESR (Ω) | 1.8 | 2.1 | 3.2 |
| DCL (μA) | 21.6 | 153.8 | 74.1 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A solid electrolytic capacitor comprising:
    an anode that comprises a porous anode body and a dielectric layer, wherein the anode body is formed from a pressed and sintered valve metal powder having a specific charge of about 200,000 μF*V/g or more and a phosphorous content of about 100 parts per million or less, and wherein the powder contains primary particles having a nodular or angular shape; and
    a solid electrolyte overlying the anode.

2. The solid electrolytic capacitor of claim 1, wherein the valve metal powder includes tantalum.

3. The solid electrolytic capacitor of claim 1, wherein the powder is formed by reacting a tantalum salt with a reducing agent.

4. The solid electrolytic capacitor of claim 3, wherein the reducing agent is hydrogen gas.

5. The solid electrolytic capacitor of claim 1, wherein the powder is formed from agglomerated particles.

6. The solid electrolytic capacitor of claim 5, wherein the powder is formed from primary particles having a median size of from about 5 to about 250 nanometers.

7. The solid electrolytic capacitor of claim 1, wherein an anode lead is be connected to the anode body.

8. The solid electrolytic capacitor of claim 1, further comprising:
    an anode termination that is in electrical connection with the anode lead;
    a cathode termination that is in electrical connection with the solid electrolyte; and
    a casing that encapsulates the capacitor anode and the solid electrolyte and leaves exposed at least a portion of the anode termination and the cathode termination.

9. The solid electrolytic capacitor of claim 1, wherein the solid electrolyte includes a conductive polymer.

10. The solid electrolytic capacitor of claim 9, wherein the conductive polymer is poly(3,4-ethylenedioxythiophene) or a derivative thereof.

11. The solid electrolytic capacitor of claim 1, wherein the solid electrolyte includes manganese dioxide.

12. The solid electrolytic capacitor of claim 1, wherein the capacitor exhibits a wet-to-dry capacitance percentage of about 75% or more, as determined at a frequency of 120 Hz.

13. The solid electrolytic capacitor of claim 1, wherein the capacitor exhibits an ESR of from about 0.05 to about 2.0 ohms, as determined at a frequency of 100 kHz.

14. The solid electrolytic capacitor of claim 1, wherein the capacitor exhibits a leakage current of about 75 microamps or less, as determined at a voltage of 6.3 V per 60 seconds.

15. The solid electrolytic capacitor of claim 1, wherein the capacitor exhibits a dissipation factor of about 65% or less, as determined at a frequency of 120 Hz.

16. The solid electrolytic capacitor of claim 1, wherein the powder has a phosphorous content of about 50 parts per million or less.

17. A method of forming a solid electrolytic capacitor, the method comprising:
    pressing a valve metal powder into an anode body, wherein the powder has a specific charge of about 200,000 μF*V/g or more and a phosphorous content of about 100 parts per million or less, and wherein the powder contains primary particles having a nodular or angular shape;
    sintering the anode body;
    forming a dielectric layer over the sintered anode body; and
    applying a solid electrolyte over the dielectric layer.

18. The method of claim 17, wherein the valve metal powder includes tantalum.

19. The method of claim 17, wherein the powder is formed by reacting a tantalum salt with a reducing agent.

20. The method of claim 19, wherein the reducing agent is hydrogen gas.

21. The method of claim 17, wherein the powder is agglomerated at a temperature of from about 0° C. to about 40° C. in the presence of a binder.

22. The method of claim 17, wherein the powder is formed from primary particles having a median size of from about 5 to about 250 nanometers.

23. The method of claim 17, wherein the solid electrolyte includes a conductive polymer.

24. The method of claim 23, wherein the conductive polymer is poly(3,4-ethylenedioxythiophene) or a derivative thereof.

25. The method of claim 17, wherein the solid electrolyte includes manganese dioxide.

* * * * *